United States Patent Office.

ALBERT A. WALKER, OF SPARTA, WISCONSIN, ASSIGNOR TO WILLIAM C. LEYBURN AND GEORGE A. FISK, OF SAME PLACE.

Letters Patent No. 107,986, dated October 4, 1870.

IMPROVEMENT IN THRASHERS AND SEPARATORS.

The Schedule referred to in these Letters Patent and making part of the same.

*To whom it may concern:*

Be it known that I, ALBERT A. WALKER, of Sparta, in the county of Monroe and State of Wisconsin, have invented a new and useful Improvement in Thrashers and Separators; and I do declare that the following is a true and accurate description thereof, reference being had to the accompanying drawing and to the letters of reference marked thereon, and being a part of this specification, in which—

Figure 3 is a plan of the upper end of the agitating rake.

Figure 4 is a plan of the cylinder.

Figure 5 is a plan of the elevating-rake; and

Figure 6 is a plan of one of the bars of the lifter-picker.

Like letters refer to like parts in each figure.

Figure 1:
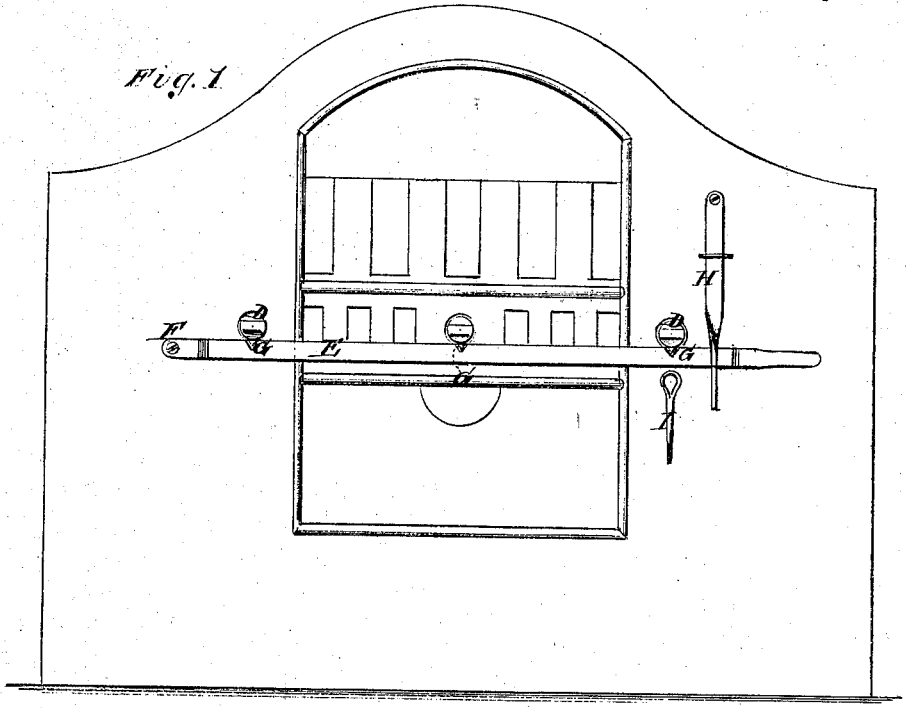
Figure 1 is a side elevation of my device.
Figure 2:
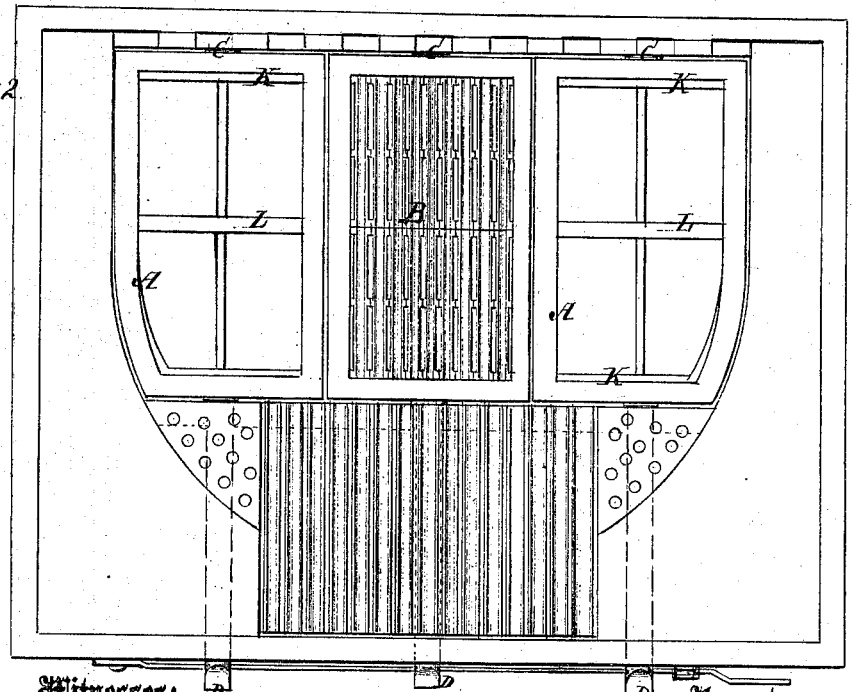
Figure 2 is a longitudinal vertical section of the same.

The nature of this invention relates to an improved and simplified construction of machines for thrashing and separating grain from the straw.

It consists in the general arrangement of the various parts, as hereinafter more fully set forth.

In the drawing—

A represents the frame-work and casing of my machine; and

B, the cylinder, journaled in the throat thereof, rotating over the slotted concave C.

D is the blast-fan, rotating in its case below the cylinder, directing a blast of air in the direction of the vibrating screen E, properly secured in the shoe E'.

F is an inclined grain-board, under the concave, through which the grain which is first separated passes, falling on the grain-board, it passes to the screen over the hopper-board *a* in the shoe.

G is a drum-shaft, journaled in the frame a little to the rear and below the concave.

G' is a similar shaft, above and to the rear of the first.

Around the drums, near the ends of the shafts, are endless belts H, having secured thereto a series of slats, H', forming an elevating rake, which takes the straw from the concave.

I is an apron, hinged across the casing above the elevating rake, to keep the straw from flying up in its movement, as well as to turn it over as it passes under its edge, loosening and detaching a considerable portion of the grain, which falls through to the screen below.

J is a reel, journaled in the casing above, and to the rear of the shaft G', its arms being provided with a series of curved pickers, J'.

These pickers receive the straw from the elevating rake, and, in the revolution of the reel, thoroughly beat or pick the straw, freeing it from the adhering grain, and discharging it on the agitating-rake K, leading to the straw-carrier.

The agitating rake is composed of two or more bands *b*, passing around a drum-shaft, L, journaled in the frame under the pulley G', and another, L', at the discharge end of the casing.

The belts have secured to them a series of slats, *c*, having projecting therefrom, parallel with the belts, a series of fingers, *d*, as shown.

As the straw is carried up, these fingers, on which it rests, by the vibration naturally imparted to them by the motion of the belts, has eliminated from it any remaining grain, which falls through to the bottom board of the casing, which conveys it to the screen.

M is another apron, hung in the casing in the rear of the picker-reel, which turns over the straw as it passes by.

The agitation of the rake K is capable of being greatly increased by the employment of polygonal drums in lieu of the cylindrical ones L L', as shown.

The various shafts are rotated in the directions shown by the arrows, and are provided with suitable belts for communicating motion from one to the other, for the thorough and complete separation of the grain from the straw, in the manner described.

If desired, two or more picker-reels may be employed.

It will be seen that a machine of this construction is much easier to run, smaller, and lighter, more compact for transportation, and costs much less than machines for the purpose now in use.

What I claim as my invention, and desire to secure by Letters Patent, is—

In the grain-separator herein shown, the improved arrangement of parts, consisting of the casing A, cylinder B, concave C, fan D, vibrating screen E, shoe E', grain-board F, drums G and G', carrying-belts H, and slats H', apron I, reel J, rake K, drums L and L', and apron M, when arranged in the manner and for the purpose herein shown and described.

ALBERT A. WALKER.

Witnesses:
J. E. SNOW,
L. POOLE.

A. B. Weeks,
Furnace Grate.

No. 107,987.      Patented Oct. 4, 1870.

Witnesses:
D. S. Mabee
D. Ansell

Inventor:
A. B. Weeks
per
[signature]
Attorneys.